United States Patent [19]

O'Berry et al.

[11] 3,922,676
[45] Nov. 25, 1975

[54] SIGNAL SORTING DEVICE

[75] Inventors: William A. O'Berry; Eugene R. Fox, both of Severna Park; Kenneth L. Plante, Baltimore, all of Md.

[73] Assignee: The United States of America as represented by the Secretary of the Navy, Washington, D.C.

[22] Filed: Nov. 12, 1964

[21] Appl. No.: 410,816

[52] U.S. Cl. ...... 343/17.1 PF; 343/11 R; 343/16 R; 343/17.1 R; 343/18 E; 343/113 R
[51] Int. Cl.² .................. G01S 9/06; G01S 3/02
[58] Field of Search ........... 343/5, 10, 11, 5 W, 5 R, 343/16 R, 113 R, 113 PT, 17.1 R, 17.1 PF, 11 R, 5 CM, 18 E

[56] References Cited
UNITED STATES PATENTS

| | | | |
|---|---|---|---|
| 2,859,437 | 11/1958 | Atlas | 343/11 |
| 2,941,116 | 6/1960 | Sherman | 343/16 |
| 3,185,983 | 5/1965 | LeParquier | 343/17.1 R |
| 3,369,235 | 2/1968 | Odams et al. | 343/113 R |
| 3,383,690 | 5/1968 | Keller | 343/113 R |
| 3,714,654 | 1/1973 | Wicks et al. | 343/18 E |

*Primary Examiner*—Maynard R. Wilbur
*Assistant Examiner*—G. E. Montone
*Attorney, Agent, or Firm*—R. S. Sciascia; P. Schneider; L. A. Hoffman

EXEMPLARY CLAIM

1. Radar signal processing equipment for indicating the presence of a radiating source having predetermined characteristics, comprising:
   a directional antenna array providing a plurality of outputs, each output corresponding, within a given resolution, to a particular angular segment of the space scanned by the antenna array;
   a plurality of processing channels wherein each of the processing channels is connected to one of the outputs from the antenna array;
   means in each processing channel to pass radar signals of only a particular carrier frequency;
   pulse width detector means to pass demodulated pulse radar signals having less than a predetermined pulse width;
   means connected to the pulse width detector to pass signals having only the proper repetition frequency; and
   dwell time detector means responsive to a succession of pulses appearing during a predetermined interval, and to an absence of pulses during a second predetermined interval, to indicate the existence of a signal source having desired characteristics.

2 Claims, 4 Drawing Figures

SIGNAL SORTING DEVICE

The present invention relates to an electronic signal processing device and more particularly to an electronic signal processing device for identifying a radiating source having predetermined characteristics in the presence of a large number of similar radiating sources, and to decode a message transmitted by the particular source of interest.

The techniques of modern electronic warfare and electronic air traffic control have necessitated the development of systems for positive identification of radar type signals by automatic means. Such systems must be simple in nature, small, light weight, and reliable. Light weight and small size are particularly necessary in the field of electronic countermeasures since such systems often find use in aircraft where the need for reliability is especially great, and where space is at a premium.

A particular embodiment of the present invention may be a passive RF surveillance system for use aboard military aircraft in order to identify specific sources of electromagnetic radiation. In some cases, the aircraft mission is to attack an enemy site, which may be an anti-aircraft gun emplacement, missile site, early warning radar, mortar emplacements, etc. Since these enemy sites in general have a radar associated with them, a passive receiver is used to identify the particular site and permit the pilot to proceed with the attack. In other cases, the pilot may wish to avoid certain enemy sites which present a danger to his aircraft and mission. Again, a passive receiver which can locate and identify the enemy radar is required.

This process of identification must often be accomplished in the presence of a cluttered radio environment. In fact, many of the target complexes will include several different radiating sources, some of whose characteristics (frequency, pulse width, pulse repetition rate, and dwell time) are similar or identical.

The requirements for a system of this type include broad RF input bandwidth, direction sorting capabilities, fine radio frequency resolution, and the capability to sort signals on the basis of their pulse width, pulse repetition rate, and dwell time.

The present systems which accomplish these functions require a large amount of signal processing circuitry plus a cathode ray tube display. These systems require the operator to visually and manually sort a variety of signals and to manually measure the various signal parameters. This results in a time consuming and complicated task which precludes the simultaneous accomplishment of other activities such as flying an aircraft.

It is an object of this invention to provide a radar signal processing system characterized by simplicity, light weight and reliability.

It is an object of this invention to provide an electronic radar signal processing system.

It is a further object of this invention to provide a radar signal processing system which will identify the existence and location of a radiating source of predetermined characteristics in the presence of a large number of radiating sources having similar characteristics.

It is a further object of this invention to provide a radar signal processing system using digital circuitry to which the techniques of microelectronics are readily adaptable.

Other objects and many of the attendant advantages of this invention will be readily appreciated as the same become better understood by reference to the following detailed description when considered in connection with the accmpanying drawings in which like reference numerals designate like parts throughout the figures thereof and wherein.

GENERAL DESCRIPTION

Figure 1:
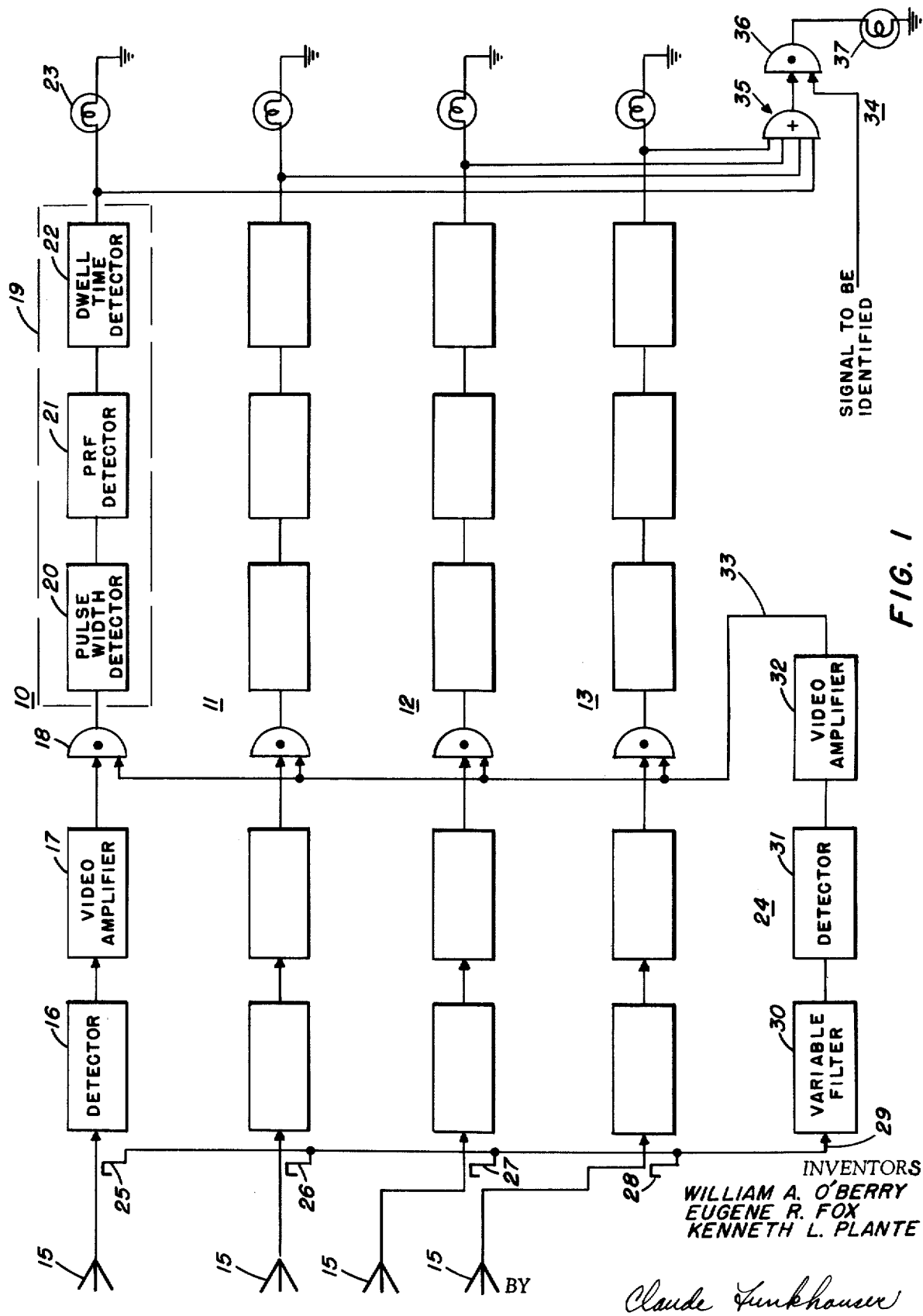
FIG. 1 shows a block diagram of the signal processing system of the present invention.

Referring now to FIG. 1, a suitable embodiment of the present invention is seen to comprise a plurality of identical signal processing channels 10 through 13, each comprising a directional signal receiver 15, a detector 16, a video amplifier 17, a coincidence gate 18, signal sorter logic 19, and suitable output means 23. Signal sorter logic 19, described in more detail with regard to FIG. 3, includes a pulse width detector 20, a pulse repetition frequency detector 21, and a dwell time detector 22. In addition, carrier frequency sorting logic 24, comprising directional couplers 25 through 28, wide band variable filter 30, detector 31, and video amplifier 32 cooperate with coincident gate 18 to provide a signal to the signal sorter logic 19 in only one of the channels 10 through 13. In addition, identification circuitry 34, comprising OR gate 35, AND gate 36, and indicator means 37 may be provided to indicate the presence of a desired signal.

DETAILED DESCRIPTION

Figure 2:
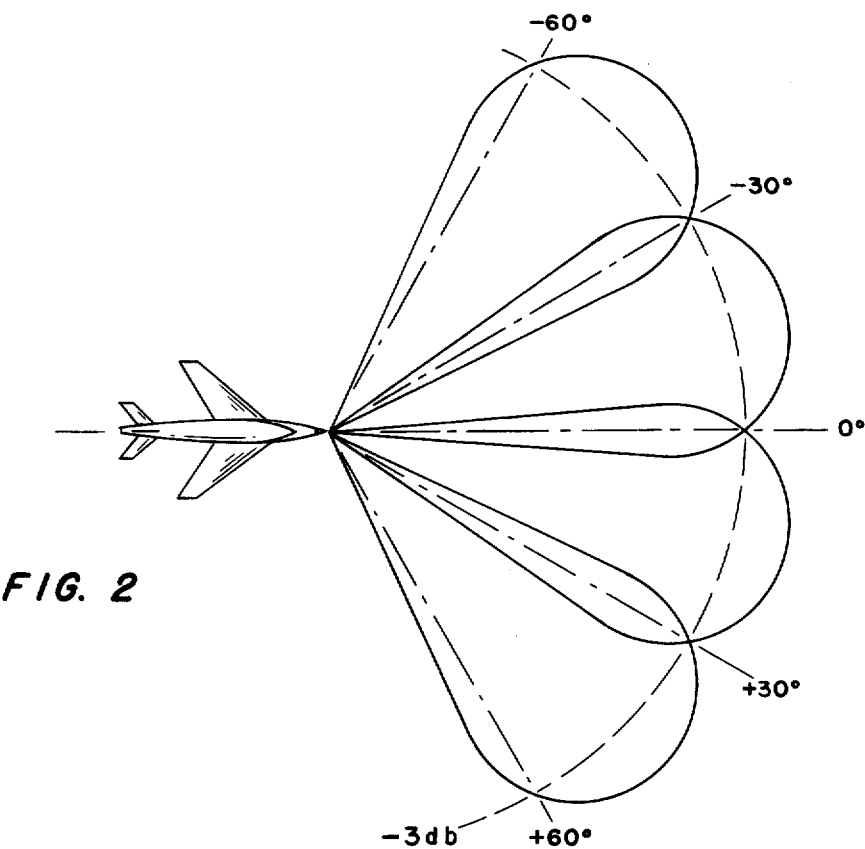
FIG. 2 is a diagram of the antenna pattern which provides direction sorting capabilities for the present system.

In the particular embodiment shown, intended for use in an aircraft passive surveillance system, the system may include a multi-antenna array, providing direct information in one plane 120° wide with an angular resolution of 30°. As shown in FIG. 2, each of the antennas may have a beam pattern of 30° azimuth and may be assumed to cover an elevation of 60°. The antennas are so arranged that the individual beam patterns cross at the three db points to form the azimuth pattern shown in FIG. 2. Since the signal sorting system provides one channel for each antenna in the array, directional information may be obtained by means of a separate antenna pattern and either manual or automatic gain adjustment that will permit a signal indication in only one channel, or alternatively, by an arrangement such as that shown in U.S. Pat. No. 3,143,735. Of course, provision may be made for a greater number of antennas in the array, each having a narrower beam width, and a correspondingly larger number of channels in the signal processing system if greater angular resolutin is desired.

In order to provide the system with a capability of sorting incoming signals from the antenna array on the basis of the carrier frequency of the radiating source, a frequency sorter 24 is provided. As shown in FIG. 1, directional couplers 25 through 28 extract a portion of the input signal from each channel and provide a combination of the signals over lead 29 to a variable filter 30 which may be tuned to the carrier frequency of interest. The filter may comprise a mixer, an intermediate frequency amplifier, a mechanically tuned cavity or a magnetically tuned ferrite device such as a YIG filter. Suitable demodulating means 31, such as a crystal detector, operate upon the output of filter 30 to provide a demodulated signal which is then amplified by the video amplifier 32. The amplified video signal is provided over lead 33 to one input of the coincidencee gate 18 in each of the signal channels. The information on lead 33 comprises only the pulse signals which were transmitted on the carrier frequency selected by the variable filter 30.

The signals appearing at the inputs to channels 10 through 13 are demodulated and amplified by detectors 16 and video amplifier 17, respectively, in each channel. These composite signals are provided, respectively, to the other input of coincidence gate 18 in each channel.

Coincidence circuits 18 act as synchronously operated gates, passing signals only in those channels in which the pulse positions correspond in time to those associated with the frequency selected. In this way signals are passed t the sorter logic 19 in only those channels corresponding to radiating sources of the proper carrier frequency. It will be recognized that use of this particular technique eliminates the need for separate filtering means in each channel.

Figure 3:
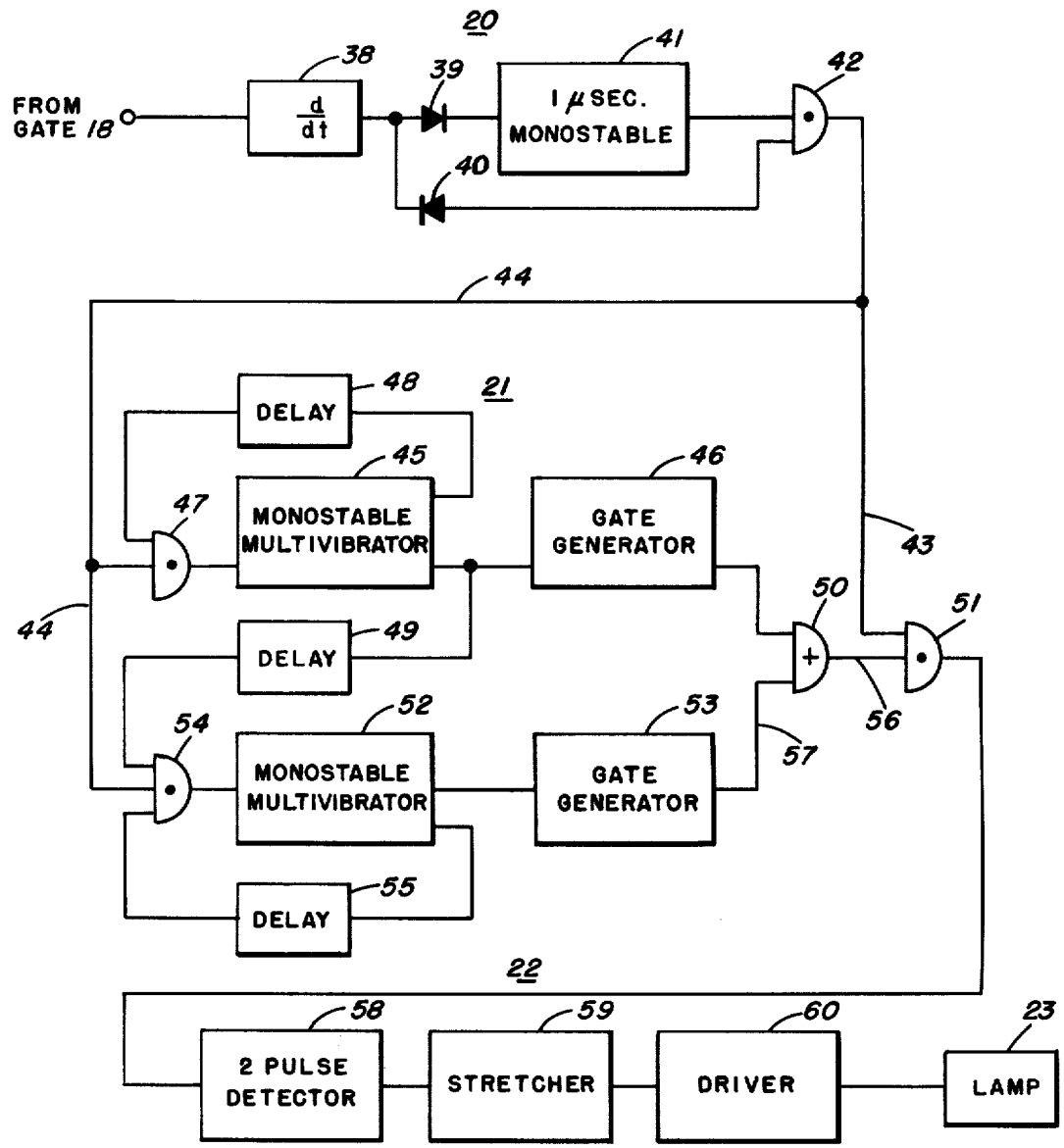
FIG. 3 is a detailed diagram of a portion of the block diagram shown in FIG. 1.

Positive target identification, even in an extremely cluttered environment, is provided by the signal sorting circuitry 19, shown in detail in FIG. 3. The signal characteristics used to identify a unique target are the pulse width, the pulse repetition frequency, and the dwell time, or the period of time per scan during which the receiver antenna array is illuminated by the scanning radiating source. The use of digital logic in the design of the identification circuitry greatly facilitates the application of micro-circuitry techniques to the present invention.

The details of signal sorting circuitry 19 are shown in FIG. 3. Pulse width detector 20 is provided to eliminate all pulse widths greater than a predetermined desired pulse width. For example, assuming that the pulse width desired is one microsecond, pulses from gate 18 are differentiated by a suitable differentiating network 38, and spikes corresponding to the leading and trailing edges of the pulses provided from gate 18 appear at the output of diodes 39 and 40, respectively. Mosostable multivibrator 41 provides a one microsecond gate in response to the leading edge of an input pulse, while the trailing edge is supplied directly to one input of AND gate 42. The other input to AND gate 42 is provided from the one microsecond multivibrator 41. As may be seen, whenever the trailing edge of the input pulse occurs within the one microsecond gate, a pulse is generated by AND gate 42. These pulses are provided over leads 43 and 44 to the pulse repetion frequency detector 21.

The PRF detector 21 consists of two identical channels to speed the time of recognition of the desired pulse train when several such pulse trains are present. The channels comprise monostable multivibrators 45 and 52 whose periods are equal to that of the expected time between pulses, gate generators 46 and 53, responsive to the end of the monostable multivibrator delay period to generate a gating pulse, and AND gates 47 and 54, the inputs to which are provided by delay circuits 48, 49 and 55 and by lead 44 from the output of the pulse width detector 20. AND gates 47 and 54 and delay circuits 48 and 55, respectively, combine to prevent monostable multivibrator 45 from being reset during the time of its delay responsive to an input pulse on lead 44. The output of monostable multivibrator 45 is also provided to the input of AND gate 54 through delay circuit 49 in order to prevent the response of multivibrator 52 to the same input pulses which set monostable multivibrator 45. Delay circuit 55 and AND gate 54 cooperate with multivibrator 52 to prevent it from being reset during its delay period. Gate generator 53 responds to the end of the delay period of monostable multivibrator 52 to provide a pulse to OR gate 50. As is readily apparent, whenever a signal is provided by either gate generator 46 or gate generator 53, a signal is provided over lead 56 to AND gate 51. Coincidence of the input signals of AND gate 51 provides an indication that the correct PRF is present.

Figure 4:
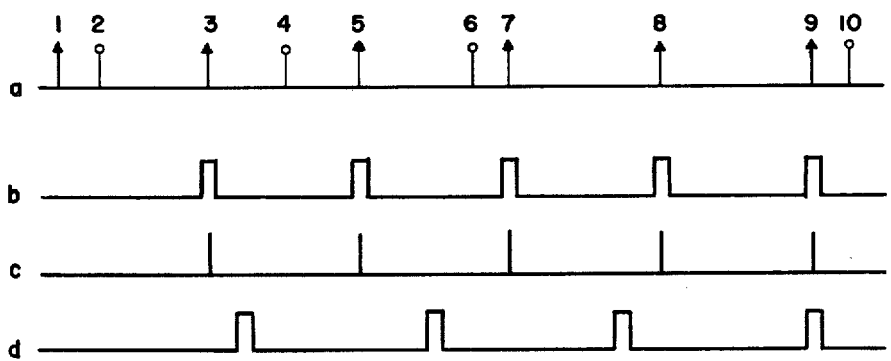
FIG. 4 is a diagram of the waveforms appearing in the sub-system shown in FIG. 3.

Referring now to FIG. 4a, pulses 1, 3, 5, 7, 8 and 9 may be assumed to represent pulses at the proper PRF, whereas pulses 2, 4, 6 and 10 may be assumed to represent pulses at a different and improper PRF. If the channel containing monostable multivibrator 45 responds to pulse 1, it may be seen that delay circuit 48 will prevent monostable multivibrator 45 from responding to pulse 2 shown in FIG. 4a. After a time period equal to the expected time between pulses at the proper PRF, gate generator 46 will respond to the end of monostable multivibrator 45 delay period and generate an output pulse as shown in FIG. 4b. This pulse passes through OR gate 50 and over lead 56 to AND gate 51. Since pulse 3 in FIG. 4a also appears on lead 43 at this time, an output from AND gate 51 will appear as shown in FIG. 4c.

Monostable multivibrator 52, on the other hand, has responded to pulse 2 and times out one pulse repetition period later as shown in FIG. 4d. At this time, a signal is applied over lead 57 through OR gate 50 and over lead 56 to AND gate 51, but since no signal appears in FIG. 4a at this time, there is no output from AND gate 51, as shown by the absence of a pulse at this time in FIG. 4c.

The presence of pulse 3 causes channel 1 to be reset, and since channel 1 is already in synchronism with the proper pulse train, it may be seen that upon the occurrence of pulse 5 an output is produced by gate 51. Pulse 5 in turn resets channel 1 and an output is provided by gate 51 for each of pulses 7, 8, and 9, as described above.

Channel 2, however, having timed out responsive to pulse 2 and having been provided with no input pulse at the end of the delay period, waits until the next pulse following pulse 3, namely pulse 4, before it is reset. At a time equal to the proper PRF period later, multivibrator 52 again times out, and again, since no pulse is present at the input, provided no output.

However, the time between pulses 7 and 8 are sufficient to overcome the effect of delay 49, therefore monostable multivibrator 52 in channel 2 may respond to pulse 8 in FIG. 4a. Therefore, upon occurrence of pulse 9 it may be seen that both the first and second channels are locked on to the desired PRF.

It may be understood that the operation of the second channel in this example represents what would happen if only one channel were used, namely, that it would take several pulse periods to detect that the desired PRF is present.

It should be recognized that the circuitry described as comprising PRF detector 21, is intended only to be exemplary, and therefore other circuitry serving the same purpose may be substituted.

The output of the PRF detector goes to dwell time detector 22, which in its simplest form may comprise a suitable two pulse detector 58, a pulse stretcher 59, a suitable driver circuit 60 and an output indicator 23, such as a lamp. Dwell time detector 22 in effect receives the output information from the PRF detector and counts the pulses in a dwell. If two or more consecutive pulses are received, two pulse detector 58 responds and provides the pulse to stretcher 59. Stretcher 59 may be a suitable monostable multivibrator whose period is equal to the expected time between dwells. Therefore, it may be seen that upon receipt of two consecutive pulses, output lamp 23 is lit and remains lit for the expected time between dwells. If dwells are received at the expected rate, then pulse stretcher 59 is reset before it returns to its off state and lamp 23 remains on continuously. If scan times longer than that expected are received, the output lamp 23 will flash on for each dwell time so that a flashing output indicates the presence of an improper dwell period.

As will be apparent to those skilled in the art, a wide variety of digital building blocks are available for use in the mechanization of the circuitry shown in FIGS. 1 and 3. For example, it is known that the proper use of inverting circuits will permit logical functions designed in terms of AND and OR building blocks, to be mechanized in terms of NAND or NOR building blocks. Similarly, proper interconnection of NAND logic elements may be used to provide monostable multivibrators. Therefore, a wide variety of elements may be used in the practice of this invention without departing from the scope thereof.

What is claimed is:

1. Radar signal processing equipment for indicating the presence of a radiating source having predetermined characteristics, comprising:
    a directional antenna array providing a plurality of outputs, each output corresponding, within a given resolution, to a particular angular segment of the space scanned by the antenna array;
    a plurality of processing channels wherein each of the processing channels is connected to one of the outputs from the antenna array;
    means in each processing channel to pass radar signals of only a particular carrier frequency;
    pulse width detector means to pass demodulated pulse radar signals having less than a predetermined pulse width;
    means connected to the pulse width detector to pass signals having only the proper repetition frequency; and
    dwell time detector means responsive to a succession of pulses appearing during a predetermined interval, and to an absence of pulses during a second predetermined interval, to indicate the existence of a signal source having desired characteristics.

2. The system of claim 1 wherein the carrier frequency filtering devices each comprise:
    means connected to each of the outputs of the directive antenna array to extract a portion of the pulse signal information and carrier signals appearing thereat,
    a variable band pass filter arrangement connected to all of said extracting means to block signals having undesired carrier frequencies,
    demodulating means connected to the variable filter to present the pulse signal information modulting the desired carrier frequency, and
    detector means in each channel connected to the output of the directional antenna array to present the pulse signal information modulating any carrier wave present at the input of the associated channel,
    coincidence means in each channel, one input thereof connected to the detector means in its respective channel, and the other input thereof connected to the detector means fed by the variable filter,
    whereby, upon coincidence of pulse information, at the desired frequency as determined by the variable filter, and a modulated signal of that frequency in any particular channel a signal will be provided by the appropriate coincidence means.

* * * * *